United States Patent [19]

Seibel et al.

[11] 3,839,620

[45] Oct. 1, 1974

[54] CONDENSATION FREE MIRROR

[76] Inventors: Richard Roy Seibel, 415 B. Hwy. 79, Morganville, N.J. 07751; Robert Rhea Seibel, 223 Matawan Ave., Matawan, N.J. 07747

[22] Filed: Oct. 13, 1972

[21] Appl. No.: 297,286

[52] U.S. Cl. .............................. 219/219, 219/543
[51] Int. Cl. ............................................. H05b 1/00
[58] Field of Search ........................... 219/219, 543

[56] References Cited
UNITED STATES PATENTS

| | | | |
|---|---|---|---|
| 2,939,807 | 6/1960 | Needham | 117/212 |
| 3,313,920 | 4/1967 | Gallez | 219/543 X |
| 3,597,586 | 4/1969 | Rebovich | 219/219 |

*Primary Examiner*—C. L. Albritton
*Attorney, Agent, or Firm*—Bloch & Santoro

[57] ABSTRACT

An anti-condensation device for mirrors comprising a printed circuit board heating element and a means for mounting said printed circuit board on the rear surface of the mirror is described. The mirror assembly herein provided with said heating element maintains the mirror viewing surface free from moisture condensation. In another embodiment of the invention the mirror assembly containing the printed circuit board additionally includes the incorporation of an electronic control package, which provides an automatic and constant operating temperature, fast warm-up, long operating life and is simple, economical and carefree to operate. This unique circuit avoids the complex and unreliable switching schemes for turning the heating element on and off.

4 Claims, 7 Drawing Figures

CONDENSATION FREE MIRROR

BACKGROUND OF THE INVENTION

The present invention relates to a condensation free mirror assembly containing a printed circuit board heating element and a means for mounting said heating element onto the rear of the mirror surface to provide heat to the front surface of the mirror and thereby prevent the formation of moisture condensation on said mirror surface. The invention is particularly adapted to mirrors located in a bathroom, steam room or the like in close proximity to a shower, or any other moisture generator, since it is common for the mirror to fog when heated water is caused to flow from the shower. This fogging of the mirror is due to condensation of warm water vapor upon the cold front surface of the mirror. Several prior art attempts have been proposed for preventing condensation on bathroom mirrors and the like.

PRIOR ART

The prior art devices for preventing condensation formation on bathroom mirrors and the like, in general, require manual energization of an electrical switch in order to permit electric current to flow through the heating element. One of such devices is adequately described in U.S. Pat. No. 3,160,736 wherein the heating element is depicted as a fibrous board formed with a continuous winding or sinuous groove containing an electrical resistance heating wire. Mass manufacturing of this winding groove and the placement of the resistance wire into this groove is not practical and is too costly. The mirror assembly described in said patent has switching apparatus, which requires the cabinet door to be closed in order to energize the heating element; hence when the cabinet door is open, the circuit through the heating element is broken and the mirror does not heat up. Fast warm-up time is a manual operation and if unattended, may exceed safe temperatures. No thermal safety devices are incorporated into the heating design. The heating system is probably inefficient because a good heat conducting bond between the heat source (wire) and mirror is not present.

In another prior art device described in U.S. Pat. No. 3,530,275 a thermal sensitive switch is mounted onto the hot water supply pipe of the shower. When heated water of a predetermined temperature flows through the pipe, the switch is closed which causes energization of the heating element mounted behind a nearby mirror. However, intricate wiring of the bathroom may be required since the method necessarily includes a connection between the thermal sensitive switch and the heating element of the mirror; in some applications this may be impracticable and costly. Hence the art is in need of a simplified, safe, easily manufactured, efficient and effortless means for preventing the condensation from forming on mirrors when said mirrors are in close proximity to showers and the like.

SUMMARY OF THE INVENTION

In accordance with the present invention, a condensation free mirror assembly is described herein. Said mirror assembly comprises a transparent mirror plate, a light reflective coating on one side of said mirror plate, an electrically energizeable heating element consisting of a printed circuit board, containing a continuous etched copper path, a means for mounting said heating element to said transparent mirror plate, a means of electrical power supply whereby electrical power can be transmitted from an electrical power source to said heating element thereby energizing said heating element to effect the heating of said plate glass. The board composition acts as a heat barrier and protects the etched copper paths from damage and the possibility of electrical shock. Printed circuit boards may be mass produced easily and economically. In a broader embodiment, the printed circuit based heating element of the present invention is useful for warming any surface.

In another embodiment of the present invention, the heating element additionally contains an aperture through which a thermal fuse, which opens the heating circuit with excessive temperature is suitably connected to the heating element and is contacted with the transparent plate glass thereby providing a means for limiting the temperature of the plate glass below a predetermined level.

In another embodiment of this invention, an anticondensation device is described comprising an electrically energizeable printed circuit board heating element; the board having an off centered aperture and an electronic control circuit. This electronic control circuit is comprised of a silicon controlled rectified (solid state switch), a snap-acting thermostat connected in series with a gate resistor having a resistance value in the range of from 0K to 10K ohms; said gate resistor being connected in series with a gate diode protector. The thermal overload protector is suitably located within said aperture to sense the mirror plate temperature and is electrically connected to said heating element; said mirror plate to be heated by said electrically energizeable printed circuit board heating element.

For further understanding of the invention and its embodiments, reference will be made to the following description and accompanying drawings wherein like numerals refer to like parts throughout and which:

Figure 1:
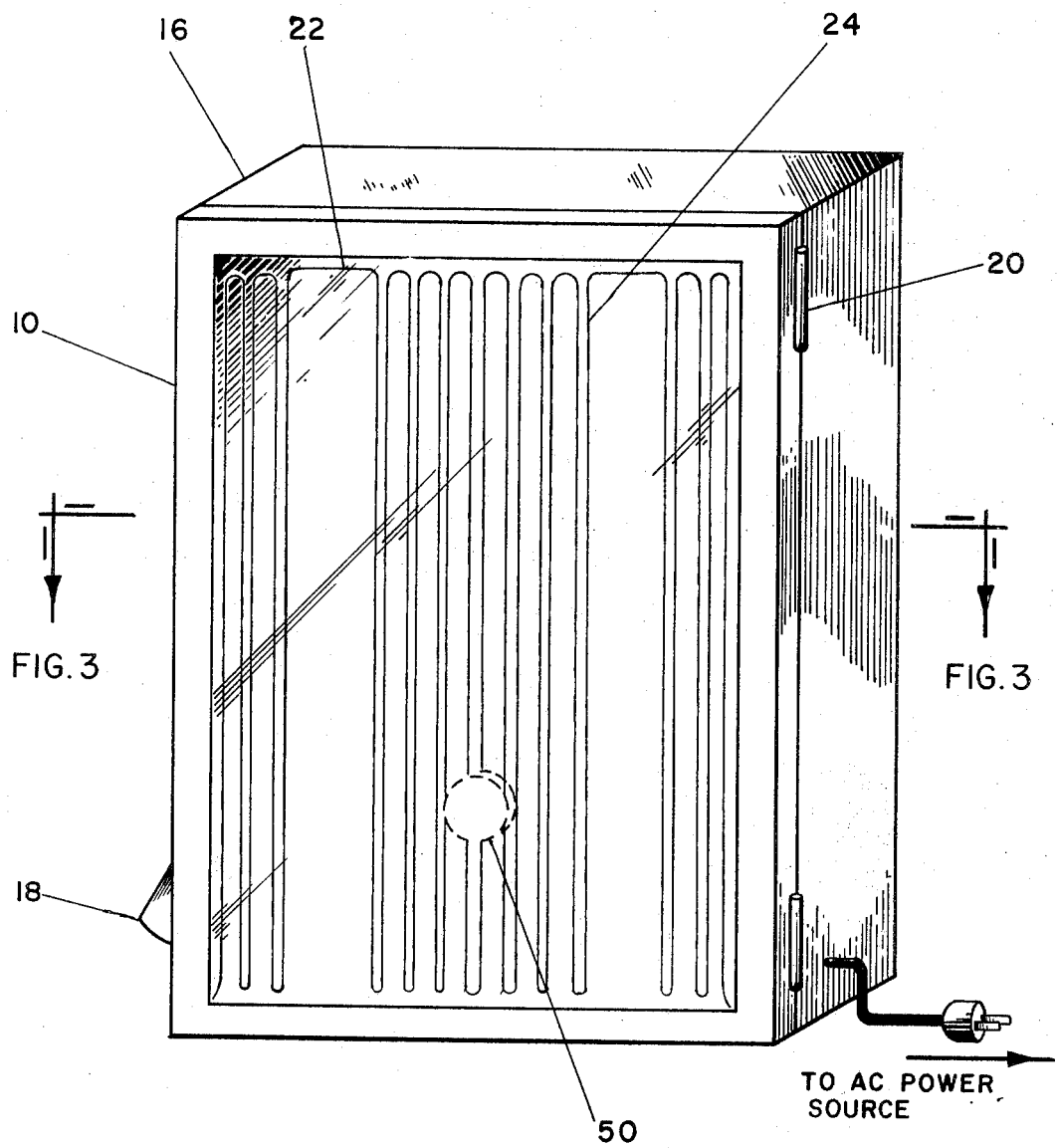
FIG. 1 is a prospective view of a typical condensation free mirror assembly.
Figure 2:
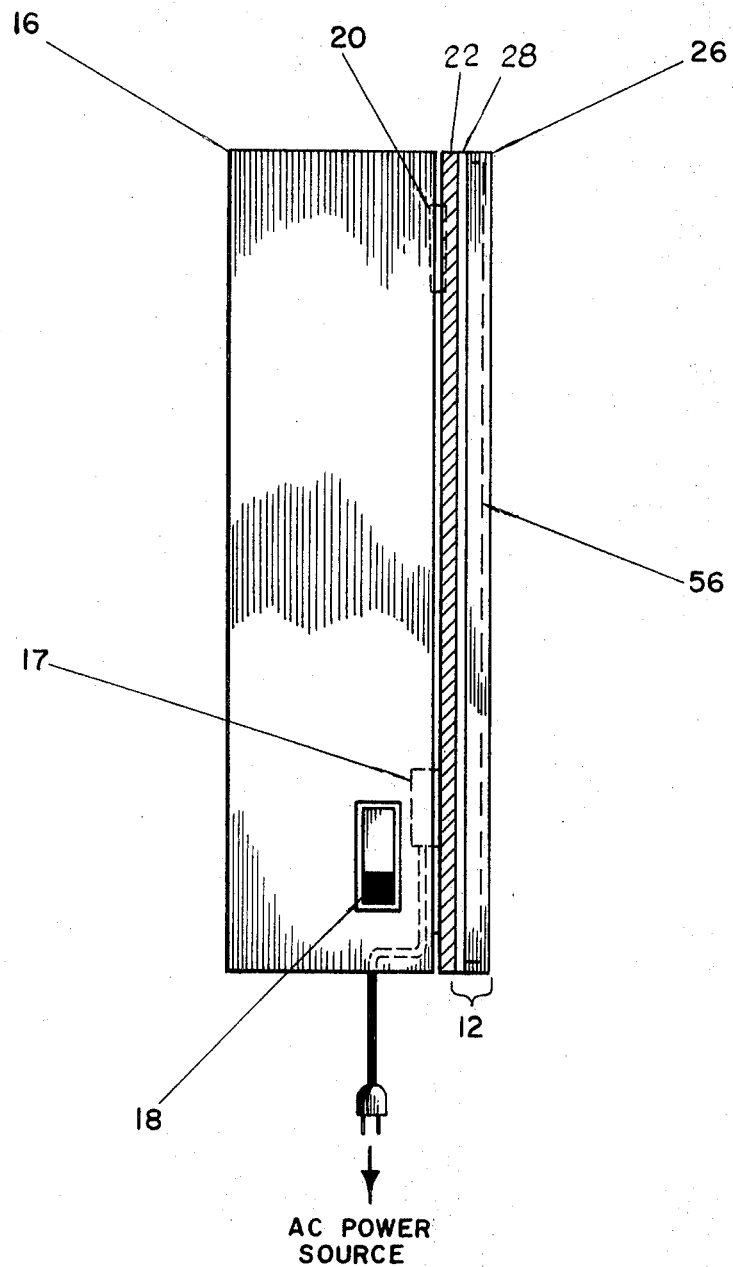
FIG. 2 is a side view of the typical condensation free mirror assembly of FIG. 1.

Referring first to FIGS. 1 and 2 there is shown a condensation free mirror 12 as assembled together with a cabinet 16; the assembly includes a rectangular open frame 10 in which is mounted a condensation free mirror 12. Mounted adjacent to the condensation free mirror is a printed circuit board heating element 22 with electronic control circuit 17 which serves to heat the mirror plate and maintain it free of condensation. Mounted adjacent to the printed circuit board is the metal back 14 of the mirror door. Connected to the printed circuit board heating element is the electronic control package 17 which is mounted by suitable means and located off center with respect to said printed circuit board heating element. A power supply cable 19 is attached through the cabinet to the electronic control package and serves to provide a means of AC power transmission.

The dotted lines shown in FIG. 1 are representative of the continuous etched copper path that forms the heating means of the printed circuit board. Also shown is an AC power switch 18 for the condensation free mirror suitably connected to the power supply cable and the electrical control package. FIGS. 1 and 2 depict the condensation free mirror assembly as found in a typical bathroom cabinet. FIG. 2 also shows hinges 20 by which means the frame mirror assembly comprising a door of the cabinet provides for opening and closing at will.

Figure 3:
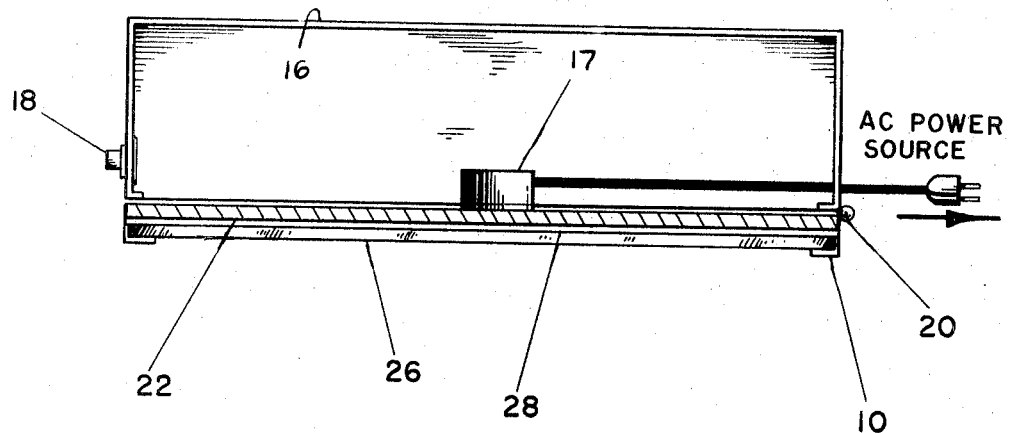
FIG. 3 is a sectional view of door on an enlarged scale taken on line 3—3 of FIG. 1.

FIG. 3 is a sectional view on an enlarged scale taken across line 3—3 and shows frame 10 and inserted in said frame is transparent glass 26 to which has been applied a reflective coating 28; mounted adjacent to the transparent glass reflective coating is printed circuit board 22 and behind the printed circuit board is the metal back of the cabinet door 15, the entire assembly being mounted to cabinet 16 by means of hinges 20 not shown.

Figure 4:
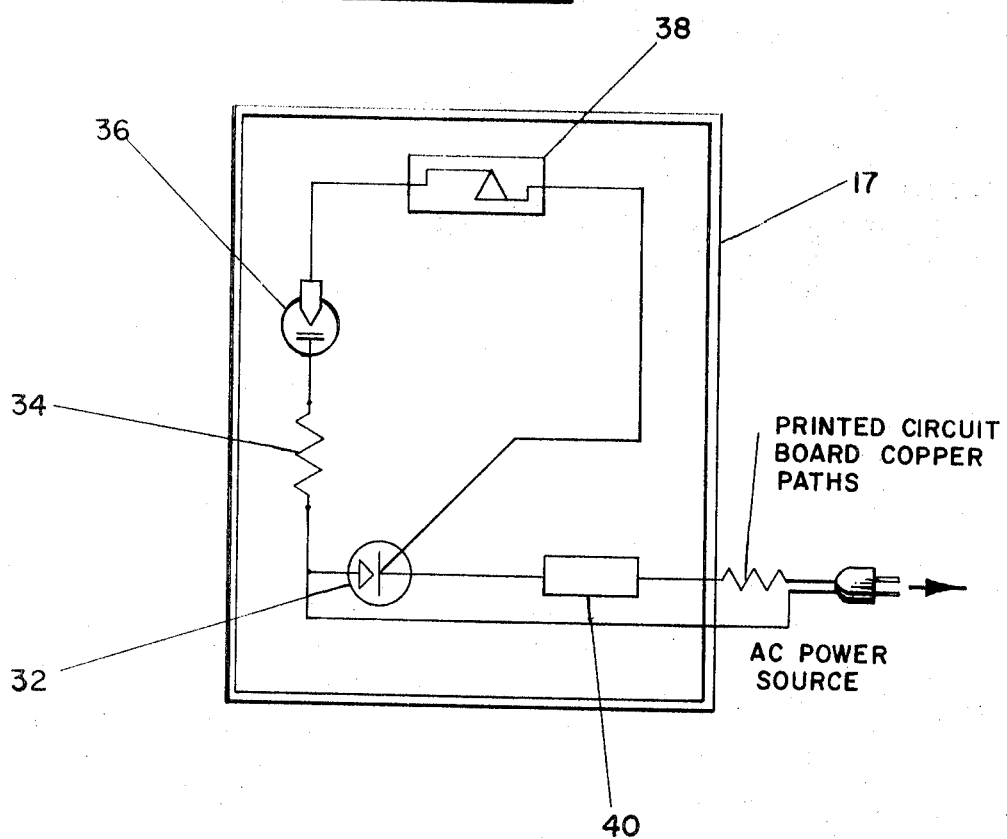
FIG. 4 is a circuit diagram of an electronic control package for use with the assembly of FIG. 1.

The circuit $C_1$ shown in FIG. 4 provides the means by which the temperature of the condensation free mirror may be controlled within a particular predetermined range. This circuit comprises a silicon controlled rectifier 32 connected in series to the thermal fuse 40 and the printed circuit board heating element 22. The gate circuit consists of a gate resistor 34 which is connected in series to a silicon diode 36 which in turn is connected to a snap action thermostat 38. These elements control the silicon controlled rectifier 32 which in turn controls the printed circuit board heating element current whereby the surface of the mirror is heated.

Circuit $C_1$ operates accordingly. The snap-action thermostat 38 senses the rear temperature of the mirror plate, and if said temperature is below a predetermined temperature range, the snap-action thermostat will close the gate circuit, which in turn applies sufficient triggering current to the gate of the silicon controlled rectifier 32 to fire the silicon controlled rectifier into heavy conduction (ON state). The snap-action thermostat is necessary to prevent any serious local radio and TV interference. The silicon diode 36 prevents excessive reverse biasing of the silicon controlled rectifier gate when the silicon controlled rectifier is in the OFF state. Gate resistor 34 limits gate current to a safe level and enables early triggering of silicon controlled rectifier 32. This early triggering eliminates radio and TV interference.

The thermal fuse 40 is in series with the printed circuit board heating circuit. The thermal fuse 40 will open the heating circuit if the rear mirror plate temperature exceeds the safe operating temperatures. The safe operating temperatures may be exceeded if the silicon controlled rectifier 32 malfunctions and shorts, or the snap-action thermostat 38 malfunctions and stays closed. The above circuit $C_1$ is suitably connected to an AC power source.

Figure 5:
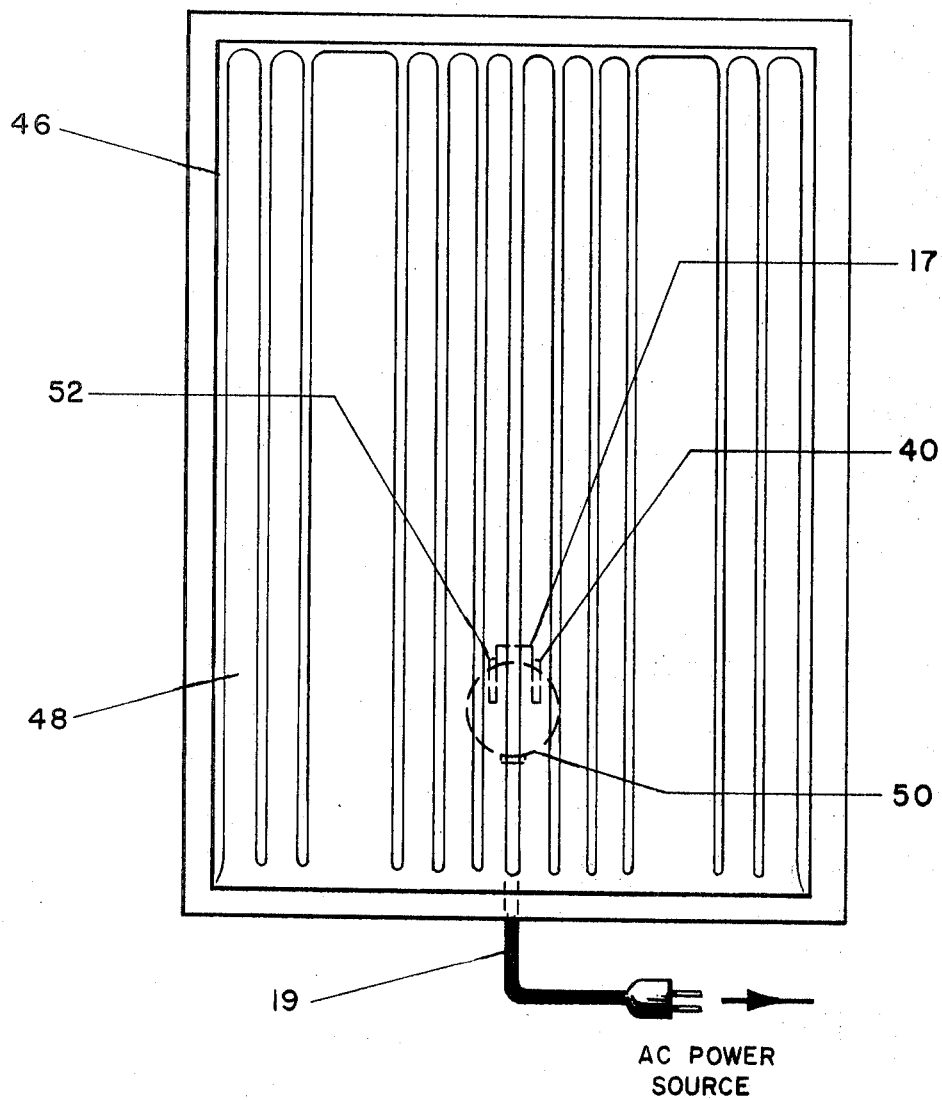
FIG. 5 is a front view of the printed circuit board heating element for use with the assembly of FIG. 1.

FIG. 5 shows the printed circuit board heating element as comprised of a continuous etched copper path 46. By varying the path width and path separation 48, various size mirrors may be accommodated. The path width varies the necessary heating resistance. Said paths are superior to the round wire in the sinuous groove approach described in U.S. Pat. No. 3,160,736 because (1) the cross-section of the path is rectangular which increases the contacting surface area for improved heat transfer and (2) there are many heat generating paths per unit area thus greatly improving overall heat distribution. This is unlike the sinuous groove approach and is therefore superior. The board also contains an aperture 50 through which a thermostat 52 and thermal overload protector 40 suitably protrudes through said aperture to make contact with the mirror thereby providing automatic temperature control and thermal protection of said mirror.

Figure 6:
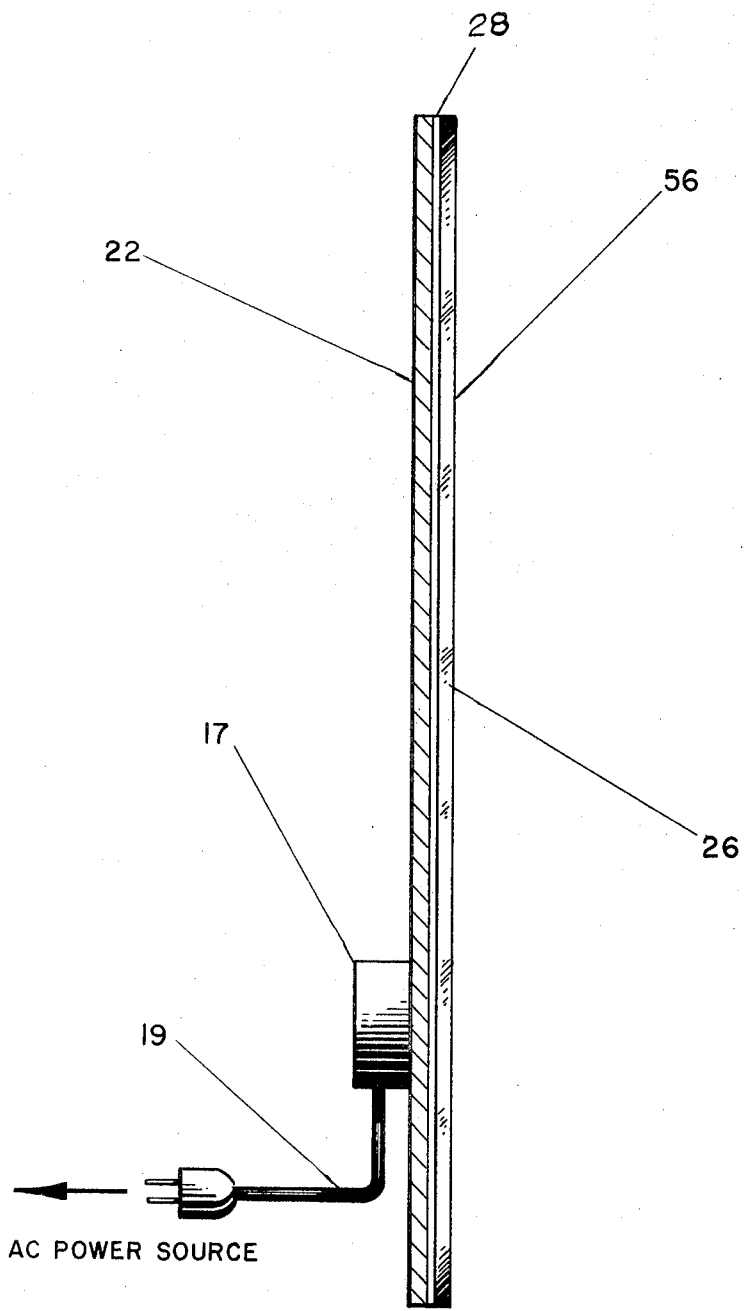
FIG. 6 is a side view of the condensation free mirror of FIG. 1 showing the locations of the printed circuit board heating element of FIG. 4 as mounted and the rear mirror surface.

FIG. 6 is a side view of the condensation free mirror of FIG. 1 showing the location of the printed circuit board heating element 22 which is mounted to the rear of transparent plate 26 to which has been applied a reflective coating 28. The printed circuit board is mounted adjacent to said reflective coating. Also shown is the electronic control package 17 which is suitably mounted off center to the lower middle of the printed circuit board in close proximity to the aperture described above for FIG. 5.

Figure 7:
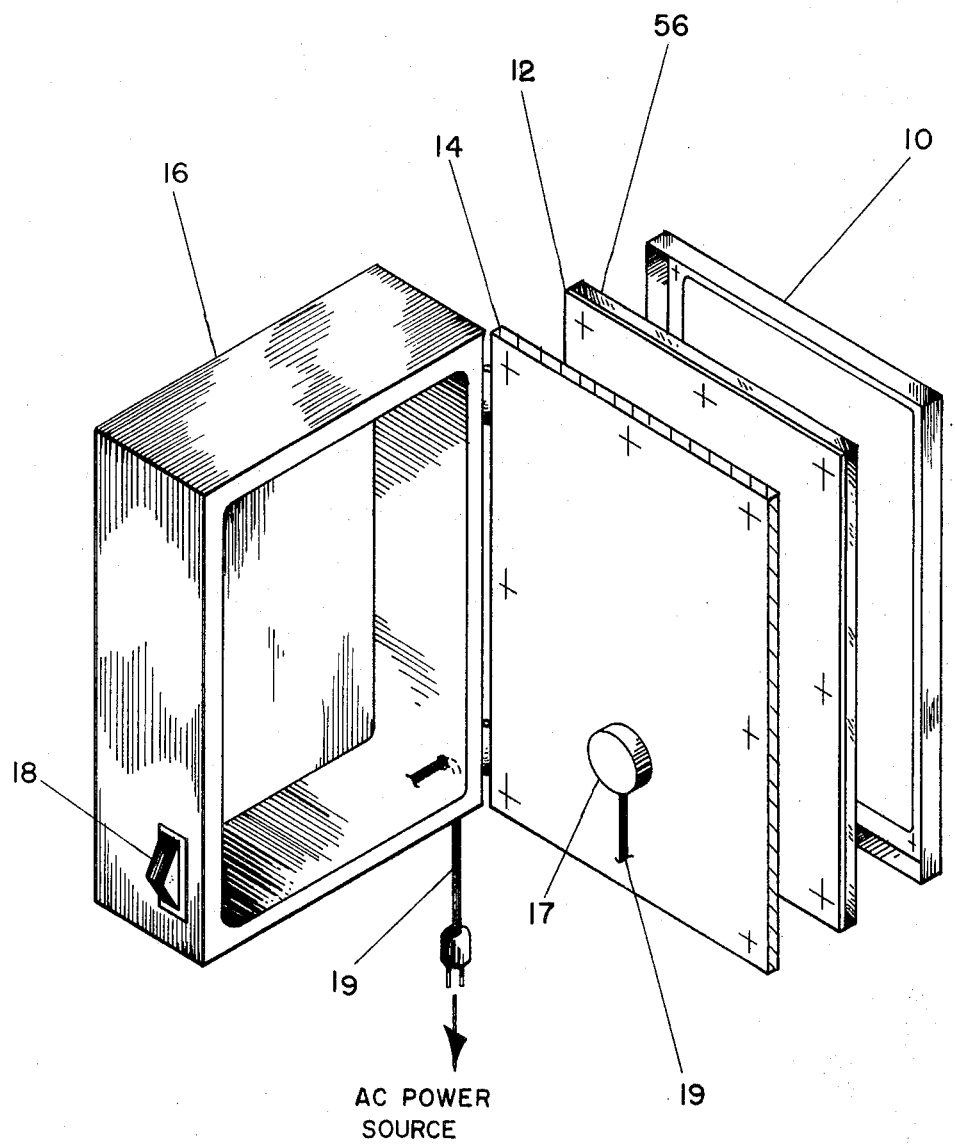
FIG. 7 is another front view of the cabinet containing the condensation free mirror assembly with the cabinet door in the open position; said mirror assembly shown in a disassembled form for illustration purposes.

Finally FIG. 7 illustrates another front view of a cabinet containing the condensation free mirror assembly with the cabinet door in the open position. The mirror assembly is shown in a disassembled form for illustration purposes.

The operation of the condensation free mirror employed in conjunction with the electronic control circuit as described above is as follows. When the snap-action thermostat of the electronic control circuit is closed, the silicon controlled rectifier will turn on and supply current to the printed circuit board heating circuit. The current will cause the etched copper paths to heat which in turn heat the rear mirror plate and then the front mirror surface. When the rear mirror surface reaches the pre-determined temperature, the thermostat will open the gate circuit and turn the silicon controlled rectifier Off. The complete process is repeated when the rear mirror temperature falls below a predetermined temperature.

As was described above, the printed circuit board is mounted to the side opposite the front mirror surface of the transparent glass of the condensation free mirror assembly. The printed circuit board copper paths are fixed to the reflective mirror surface. In carrying out the present invention, the following describes the means for mounting said printed circuit board. A heat conducting and electrical insulator paint is brushed onto the surface of the printed circuit board containing the continuous etched copper path. The paint provides additional electrical insulation and a good bonding surface which will later be epoxied to the back of the mirror. The etched surface is epoxied to the back of the mirror. The heat conducting epoxy greatly improves the efficiency of transferring the heat from the heat source (paths) to the rear of the mirror. This method of heat transfer is superior to the existing state of the art. The pre-requisites for the epoxy useful with the present invention include that it have the following properties: (1) an excellent electrical insulator; (2) an excellent heat conductor; (3) chemically inert; (4) somewhat physically flexible; (5) able to withstand temperatures up to 150°F.; (6) easily applicable before set time; (7) adhers excellent to reflective coating and to heat conducting paint; (8) low cost or moderately low cost.

The epoxy used in the present invention is one which has the following chemical composition. The epoxy is Dolphon CG1062A which is epichlorhydrin bisphenol; a resin with fillers which are basically talc and silica; the hardner is a polyamine hardner (Dolphon RE-2002); the heat conducting paint is synthite Dolphon EB-43-FB flat black enamel.

The electronic control package described above in reference to FIG. 4 has two components which are critical for the proper operation of said control package in conjunction with the present invention. First of these components is the snap-acting thermostat, in FIG. 4 is shown as 38; if a "creeper" action thermostat were used rather than a snap-action thermostat, a considerable amount of undesirable RF noise would be produced which would interfere with the operation of any local radio or TV receiver when operating. The utilization of the snap-action thermostat therefore provides RF free operation and additionally is longer lasting than the "creeper" action thermostat.

The second component critical to the operation of the electronic control package to be used in conjunction with the present invention is a gate resistor having a very low resistance value. While the present invention is operable when resistance values of this gate resistor goes as high as 6 megohms, very high RF noise results at these high resistance values. Preferably, then the value of the gate resistor is from about 0K to 10K, most preferably from 0 to 3 kohms.

The heating current switching operation utilized in the control package described in FIG. 4 is done by means of the silicon controlled rectifier 32. This switching significantly increases the life span of the device. The silicon controlled rectifier acts as a high current switch which replaces other large unreliable relays. The thermostat in the gate circuit controls the SCR and maintains the temperature of the mirror within prescribed values. When the condensation-free mirror is used with the electronic control package, described above, the mirror is easily maintained at temperatures in the range of from 85° to 136°F., more preferably from 92° to 103°F. Since the mirror will always be heated to temperatures in these ranges, no condensation forms on the mirror surface during times that the shower or bath is being used.

The invention as described above, therefore provides a simple, efficient, effortless and economical means of raising the temperature of a mirror sufficiently above the dew point and thereby prevents condensation droplets from forming. The innovating concept utilized with the present invention is limiting the temperature within the prescribed ranges of the mirror which is accomplished by incorporating the electronic control package as described above. This allows carefree and economical operation not afforded by other similar devices. Additionally, the use of the electronic control package eliminates the need for any complex and unreliable switching schemes for manually turning the heating element on and off.

We claim:

1. A condensation free mirror assembly comprising a transparent plate, a light reflective coating on one side of said plate, an electrically energizeable heating element consisting of a printed circuit board containing a continuous path of etched copper, said path being of a uniform thickness, a means for mounting said heating element on said transparent plate, a means of supplying electric power to said heating element whereby electrical power can be transmitted from an electrical power source to said heating element thereby energizing said heating element whereby said plate is heated.

2. A condensation free mirror assembly comprising a transparent plate, a light reflective coating on one side of said plate, an electrically energizeable heating element consisting of a printed circuit board containing a continuous path of etched copper, said path being of uniform thickness, said printed circuit board further having an aperture through which a thermal fuse suitably contacts said plate thereby providing a means for maintaining the temperature of said plate below a predetermined level, a means for mounting said heating element on said transparent plate, a means of supplying electrical power from an electrical power source to the heating element whereby the heating element is energized thereby heating said plate.

3. The condensation free mirror assembly of claim 2 wherein said means for mounting said heating element to said plate comprises coating the surfaces of said heating element and plate with an epoxy comprising epichlorhydrin bisphenol and thereafter contacting said coated surfaces, one to the other.

4. The condensation free mirror assembly of claim 2 wherein the temperature of said plate is maintained in the range of from about 85°–136°F.

* * * * *